Figure 1:
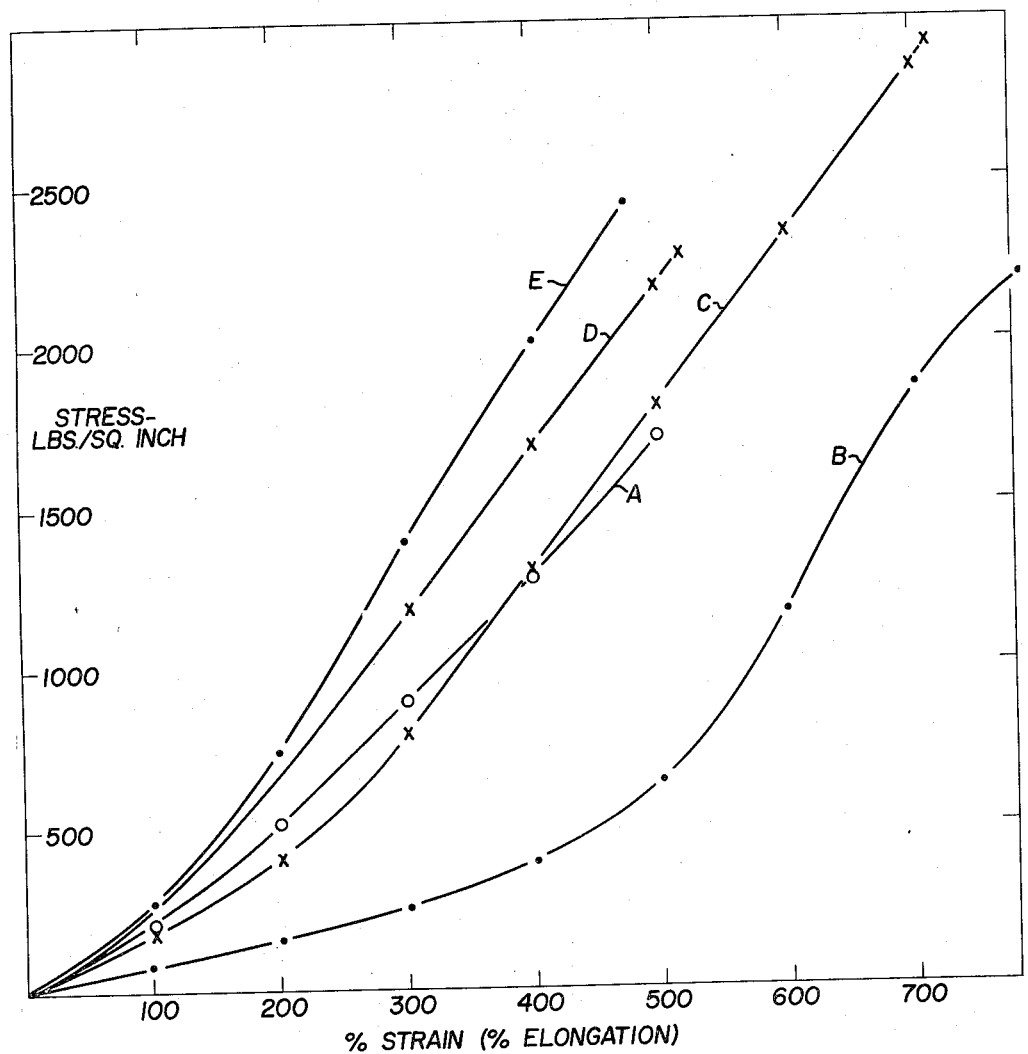

VULCANIZATION OF BUTYL AND GR-S
WITH DI ORTHO TOLYL GUANIDINE

Francis P. Ford    Inventor

By *W. H. Smyers*    Attorney

Aug. 9, 1960

F. P. FORD 2,948,320

CO-VULCANIZED BUTYL RUBBER WITH HIGHLY
UNSATURATED RUBBERS BY AMINO COMPOUNDS

Filed May 2, 1955

2 Sheets-Sheet 2

Francis P. Ford   Inventor

By   W. N. Smyers   Attorney

> United States Patent Office 2,948,320
Patented Aug. 9, 1960

2,948,320

CO-VULCANIZED BUTYL RUBBER WITH HIGHLY UNSATURATED RUBBERS BY AMINO COMPOUNDS

Francis P. Ford, Watchung, N.J., assignor to Esso Research and Engineering Company, a corporation of Delaware Filed May 2, 1955, Ser. No. 505,168

18 Claims. (Cl. 152—330)

This invention relates to new and useful co-vulcanizable admixtures of butyl rubber and highly unsaturated rubbers and to methods for curing mixtures of butyl rubber with more highly unsaturated rubbers in the presence of conventional curing agents such as sulfur, zinc oxide, but preferably in the substantial absence of ultra accelerators, especially of thiuram and carbamic acid derivatives.

The present invention relates more particularly to processes for producing co-vulcanizable mixtures and for co-vulcanizing said mixtures which are of butyl rubber and such highly unsaturated rubbers as the following: natural rubber, rubbery copolymers of butadiene and styrene (GR-S and/or rubbery copolymers of butadiene and acrylonitrile (Buna-N rubber) with sulfur and/or sulfur containing curatives in the presence of organic nitrogen containing compounds containing at least one $$-\underset{H}{N}-$$

group as co-vulcanization agents.

The organic nitrogen containing co-vulcanization agents of the present invention include amides, and especially amines and/or organic nitrogen compounds containing at least one amido and/or especially an amino group. The organic nitrogen containing compounds of the present invention are generally characterized by being polyalkylated amines or amides, aldehyde amines or amides (such as phenyl amine-butyraldehyde reaction products), sulfur containing amines and amides, guanidines including guanidine and aryl guanidines, sulfur containing guanidines such as thioureas, etc.

The use as co-vulcanization agents of the above nitrogen-containing compounds according to the present invention (which compounds are preferably selected from the group consisting of aldehyde-amine reaction products, polyalkylated amines, sulfenamides, and guanidines, such as polyaryl guanidines, sulfur-containing guanidines, etc., mixtures thereof) is especially effective to facilitate the omission of accelerators of the type known as "ultra accelerators." These ultra accelerators have heretofore been used almost exclusively for the vulcanization of butyl rubber.

A general process according to the present invention comprises forming a composition containing an admixture of butyl rubber and at least one other highly unsaturated rubber, sulfur and about 0.1 to 5.0 wt. percent of a nitrogen-containing organic compound which has at least one $$-\underset{H}{N}-$$

group therein. Such compounds include aldehyde amines, alkylated amines, sulfenamides, polyaryl guanidines and sulfur-containing guanidines. To the above composition, about 0–50 wt. percent of a basic metal compound such as zinc oxide is then added. The above new and useful co-vulcanizable compositions are then sulfur-cured at a temperature of about 250°–400° F. for about a minute up to about several hours or more to give improved co-vulcanizates.

By such a process as the above, new and improved co-vulcanizable rubbery compositions are formed by compounding unvulcanized butyl rubber and/or butyl reclaim and/or partially vulcanized butyl rubber with the above nitrogen containing compounds, a highly unsaturated rubber such as natural rubber, GR-S rubber, and/or Buna-N rubber, or their equivalents and about 0–30 parts by weight (preferably about 5–10 parts by weight) per 100 parts by weight of total number of hydrocarbons of basic metal compounds including bivalent metal oxides such as zinc oxide. The above composition is then vulcanized as above outlined in the presence of sulfur and/or a sulfur-containing vulcanizing agent.

It has heretofore been considered impossible to obtain satisfactory vulcanizates from blends of butyl rubber and more highly unsaturated rubbery polymers such as GR-S, natural rubber or Buna-N rubber, especially where the amount of highly unsaturated rubbery polymer is greater than about 4% by weight. Heretofore, the blend of butyl rubber and more highly unsaturated rubbers when vulcanized have produced a product wherein severe blistering occurred and wherein the porosity of the vulcanizates was high. In general, the vulcanized products of such blends were not homogeneous and were laminated. Furthermore, their tensile strengths were inferior and they tended to crack and peel.

The inability of ordinary butyl rubber to cure with all proportions of highly unsaturated rubbers such as natural rubber, GR-S, Buna-N, etc., is pointed out in the 1954 edition of "Synthetic Rubber" by G. S. Whitby and in such patents as U.S. 2,631,984 and 2,681,899 and others, wherein it is stated that there is a substantial inability of butyl rubber and other highly unsaturated rubbers to co-vulcanize, etc. Therefore, vulcanized mixtures of butyl rubber and natural or GR-S rubber have heretofore been less valuable than either rubber alone.

The failure of butyl rubber to satisfactorily cure with all proportions of other common rubbers such as natural rubber, GR-S, Buna-N, etc., has been a serious obstacle to the more extensive use of butyl rubber in rubber-containing articles such as various laminated structures including flexible rubber belts, hosing, and rubber tires, where in many instances, a blend of various rubbers is desirable, but only if the rubbers are compatible with one another and may be adhesively joined, co-vulcanized, etc.

The discovery of the present invention has been particularly surprising since it is hereinafter shown that compounds containing $$-\underset{H}{N}-$$

groups, i.e., organic amino type compounds such as substituted amines and guanidines give inferior curing rates for butyl rubber. Also, it has heretofore been commonly believed that the large discrepancy in curing rates of butyl rubber compared to GR-S or natural rubber was a prime factor in causing poor vulcanizates of admixtures of butyl rubber with such other rubbers. It was further believed that the presence of any materials which cured butyl rubber at a retarded rate such as substituted amines and/or guanidines would widen the curing rate discrepancy between butyl rubber and highly unsaturated rubbers. Therefore, the finding of the present invention that the use of organic nitrogen-containing compounds such as amines, guanidines and certain amides (i.e. organic compounds containing at least one $$-\underset{H}{N}-$$

group) renders butyl rubber satisfactorily co-vulcanizable with highly unsaturated rubbers is most unexpected in view of the above.

It is a further discovery of the present invention that the use of compounds containing

groups, i.e. inorganic nitrogen-containing compounds especially including aldehyde amines, polyalkylated amines, polyaryl guanidines and sulfur-containing guanidines, while retarding the curing rate of butyl rubber per se in fact accelerate the curing rate of admixtures of butyl rubber with highly unsaturated rubbers such as GR–S, natural rubber, Buna-N rubber, etc. In fact, the curing rate of the rubbery blends of the present invention is higher than the curing rate of either of the component rubbers.

It has been discovered that high quality vulcanized blends of butyl rubber and any amount of the more highly unsaturated rubbers can be produced providing a particular class of modifying agents (co-vulcanization agents) be used in the sulfur-vulcanization process. These modifying agents are compounds containing

groups; i.e. organic nitrogen-containing compounds which are generally characterized by containing amido and especially amino groups. Such compounds are preferably aldehyde amine reaction products, polyalkylated amines, polyaryl guanidines, sulfur-containing guanidines, sulfenamides and mixtures thereof. Such compounds include reaction products of aniline and butyraldehyde, para-toluidine and formaldehyde. They also include triethyl-trimethylene triamine, hexamethylene tetramine, diphenyl guanidine, diortho tolyl guanidine, 2-mercapto-imidazoline (i.e. ethylene thiourea), tertiary butyl-2-benzothiazole-sulfenamide, etc.

As pointed out heretofore, the organic amino and/or amido type organic compounds of the present invention are particularly effective in the substantial absence of the so-called "ultra accelerators" such as "Tuads" (tetra methyl thiuram disulfide) or "Tellurac" (tellurium diethyl dithiocarbamate).

Figure 2:
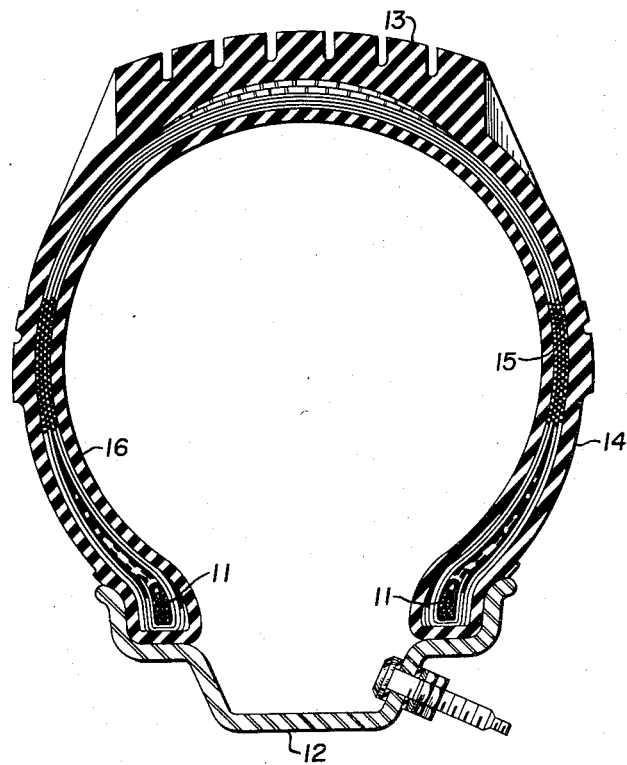

The invention will be demonstrated hereinafter with reference to the accompanying drawings, in which:

Figure 1 is a graphical representation in the form of a stress-strain diagram showing the improvement in curing rate (curing efficiency) of admixtures of butyl rubber and GR–S rubber as compared to GR–S rubber and butyl rubber per se. Said representation is employed to show that the use of organic nitrogen-containing compounds such as amides (especially sulfenamides) and preferably amido organic compounds including aldehyde amines, polyalkylated amines, aryl guanidines and sulfur-containing guanidines, etc., according to the present invention increase the curing rate and curing efficiency of blends of butyl rubber and GR–S rubber above the curing rates and efficiencies of either rubber alone, whereas the use of the same organic nitrogen-containing compounds give inferior curing efficiencies and curing rates of butyl rubber per se; and, Figure 2 is a cross-sectional view of a pneumatic tubeless tire employing therein a butyl rubber co-vulcanized with other highly unsaturated rubbers according to the present invention, whereas the tire is shown as being mounted on a conventional tire wheel rim.

The butyl rubber of the present invention generally comprises a copolymer of a major proportion of an olefin such as relatively low molecular weight iso-olefin (e.g. isobutylene) and a minor proportion of a multi-olefin, preferably having a ratio of the iso-olefin to the multi-olefin of about 90–99.5% to about 10–0.5%, respectively. Copolymers of the above general type, especially where the copolymer is above about 85% (and especially above about 90%) to about 99.5% of a $C_4$–$C_7$ iso-olefin, such as isobutylene with about 15–0.5% (preferably about 10–0.5%) of a multi-olefin of about 4–14 carbon atoms are commonly referred to in patents and literature as "butyl rubber" or GR–I rubber (Government Rubber-Isobutylene) and, for example, is referred to as "butyl rubber" in patents and in textbook "Synthetic Rubber" by G. S. Whitby (1954 edition by John Wiley & Sons, Inc.) pages 608–609, etc. The preparation of butyl-type rubbers is described in U.S. Patent 2,356,128 to Thomas et al. and also in other patents as well as in literature. In general, the rubber comprises the reaction product of a $C_4$–$C_7$ iso-olefin (preferably isobutylene) with a $C_4$–$C_{10}$ multi-olefin such as isoprene, butadiene, dimethyl butadiene, myrcene, piperylene, allo-ocimene, etc. The reaction product of isobutylene and isoprene is preferred.

In general, the polymer has a Staudinger molecular weight within the range between about 20,000 and 100,000. The viscosity average molecular weight is above about 300,000, up to about 1,500,000 or higher. The iodine number (Wijs) is in the range from about 1–50, preferably in the range from about 1–20. The above copolymer when cured has a good elastic limit, tensile strength, abrasion resistance and flexure resistance. The butyl copolymer may be compounded with various fillers, pigments, plasticizers, and anti-oxidants.

Typical highly unsaturated rubbers for use in the blends of the present invention as mentioned heretofore, are a copolymer of butadiene and styrene (GR–S), natural rubber, and Buna-N rubber which is the reaction product of butadiene and acrylonitrile.

GR–S is preferably obtained by polymerizing butadiene and styrene in aqueous emulsion. Polymerization is initiated by bringing the monomer mixture to a temperature between about −40° C. and about +100° C., preferably between about −40° C. to about +50° C., in the presence of a substance capable of accelerating the reaction such as a peroxide or persulfate with or without added solvents. When polymerization is complete the polymer is separated from unreacted monomer and/or solvent and water generally by distillation.

The above general process for producing GR–S rubber may likewise be generally employed for producing Buna-N rubber, which is a copolymer of butadiene and acrylonitrile and other rubbery polymers as hereinafter indicated. It may be applied, for example, to polymers obtained by the polymerization in aqueous emulsion of conjugated diolefins, such as butadiene, isoprene, piperylene, dimethyl butadiene, 2-chlorobutadiene-1,3, taken singly or in combination, or to emulsion copolymerizates obtained by polymerizing such diolefins in combination with unsaturated co-monomers, i.e., copolymerizable compounds containing a single terminal methylene group such as styrene (supra), and also homologues of styrene, such as alpha methyl styrene, para methyl styrene, alpha methyl para methyl styrene, nitriles of low molecular weight unsaturated acids such as acrylonitrile (supra), methacrylonitrile, chloroacrylonitrile, methyl acrylate, methyl methacrylate and ketones such as methyl vinyl ketone or mixtures thereof.

Other highly unsaturated synthetic rubbers employed according to the present invention may be polymers of substituted butadienes-1,3 which include butadiene-1,3 or its homologs such as isoprene and 2,3-dimethyl butadiene, where the substituents are either chlorine or cyano groups, or the synthetic rubbers may be rubbery copolymers of various of the butadienes-1,3 with other ethylenic monomers, and in this case either the butadienes or the ethylenic monomer or both the butadienes and the ethylenic monomer may contain substituents of chlorine or cyano groups. The copolymer generally contains at least 50% by weight of one of the butadienes-1,3. Such compounds useful in the present invention include polymers of 3-chloro butadiene-1,3, 3-bromo butadiene-1,3,3, cyano butadiene-1,3 chloro isoprene, bromo isoprene, and cyano isoprene. They also include polymers of butadiene-1,3 with vinylidene chloride, p-chloro styrene, or methyl alpha chloro acrylate; copolymers of 3-chloro butadiene-1,2 with the above and/or with acrylonitrile, methacrylonitrile, etc.; copolymers of 3-cyano butadiene-1,3 with the above; copolymers of 2,3-dimethyl butadiene with either 3-chloro butadiene-1,3 or 3-cyano butadiene-1,3 etc. Those compounds which are copolymerized with the butadienes are preperably ethylenic monomers and it is preferred that they contain a $CH_2=C<$ group. This is not absolutely necessary, however, as ethylenic monomers containing only one or more $>C=C<$ groups are also workable. Vulcanization may be obtained either at ordinary room temperature or at higher temperatures, depending upon the choice of vulcanization accelerators.

The respective quantities of the butyl rubber utilized in conjunction with the high unsaturated rubber may vary appreciably, as for example, 99% by weight of butyl to 1% by weight of the unsaturated rubber; to 1% of butyl and 99% by weight of the unsaturated rubber. The proportions of each component used will depend to a great extent upon the ultimate use for which the product is designed. It is to be understood that the butyl rubber may comprise any proportion of unvulcanized butyl rubber, butyl reclaim rubber, partially vulcanized butyl rubber, etc.

The amount of the organic amino and/or amido compound used according to the present invention may likewise vary appreciably. In general, it is advantageous to use about 0.1–5.0%, preferably about 0.25–2.5 wt. percent, based upon the total amount of rubber present.

The vulcanization conditions are generally in the range from about 250°–400° F., preferably at about 280°–320° F. for about a minute up to about several hours or more. Preferred times are from about 10 minutes to 2 hours.

In order to more fully illustrate the invention, the following examples are given:

*Example I*

A master batch of butyl and GR-S rubber, together with fillers was prepared of the following composition:

| Ingredient | Parts by Weight | |
|---|---|---|
| | General Range | This Example (Comp. A) |
| Butyl rubber (GR-I-17) | 1– 99 | 75 |
| GR-S rubber | 99– 1 | 25 |
| Gastex (SRF black) | 0–150 | 50 |
| Zinc oxide | 0– 50 | 5.0 |
| Stearic acid | 0– 5 | 0.5 |
| Sulfur | 0.1– 10 | 3.0 |

The above composition was divided into 4 portions and cured at 307° F. for 40 minutes in the presence of 0.5 parts by weight of an ultra accelerator ("Tuads," i.e. tetramethyl thiuram disulfide) and 1.0 parts by weight of diphenyl guanidine (DPG), respectively, both with and without 5 parts of $PbO_2$. The resulting composited blends were as follows:

| Component | 1 | 2 | 3 | 4 |
|---|---|---|---|---|
| Composition A | 158.5 | 158.5 | 158.5 | 158.5 |
| Tuads | 0.5 | 0.5 | | |
| DPG | | | 1.0 | 1.0 |
| $PbO_2$ | | 5.0 | | 5.0 |

The physical properties of these portions were as follows:

| Stress-Strain Properties (cure for 40 min. at 307° F.) | Portion 1 | Portion 2 | Portion 3 | Portion 4 |
|---|---|---|---|---|
| Modulus at 100% E (p.s.i.) | 620 | 840 | 575 | 475 |
| Modulus at 200% E (p.s.i.) | 660 | 1,310 | 860 | 740 |
| Modulus at 300% E (p.s.i.) | | | 1,060 | 930 |
| Modulus at 400% E (p.s.i.) | | | | 1,050 |
| Tensile strength (p.s.i.) | 685 | 1,540 | 1,150 | 1,080 |
| Appearance | (1) | (2) | (2) | (2) |

[1] Non-homogeneous.
[2] Smooth and homogeneous.

From the above it is apparent that the butyl rubber-containing compositions which contain diphenyl guanidine (DPG) produced products having satisfactory tensile strength, both with and without added lead dioxide, whereas the other compositions containing "Tuads" instead of DPG did not, unless lead dioxide was added. Satisfactory tensile strengths are those above about 1000 p.s.i. Furthermore, the rubbery products shown in portions 2, 3 and 4 were dense, homogeneous, rubbery products whereas portion 1, which did not contain diphenyl guanidine was a porous, and non-homogeneous mixture which had a cracked and scaling surface.

*Example II*

The following blends of butyl rubber and GR-S rubber were prepared as follows:

| | Parts by Weight | | |
|---|---|---|---|
| | 1 | 2 | 3 |
| Composition A | 158.5 | 158.5 | 158.5 |
| Tuads (tetramethyl thiuram disulfide) | | | 0.5 |
| Diphenyl guanidine (DPG) | 1.0 | 1.0 | 0.5 |
| $PbO_2$ | | 5.0 | |

The above portions were then cured for 40 minutes at 307° F. Portion 1 vulcanized to form a material which was homogeneous in nature having a smooth surface, and was a satisfactory co-vulcanizate. Portion 2 was a somewhat less satisfactory vulcanizate and contained small pores and minute blisters. Portion 3 was an unsatisfactory vulcanizate in that it was substantially completely non-homogeneous, badly blistered and cracked and very porous. The following physical characteristics were also observed:

| Stress-Strain Properties | Portion 1 | Portion 2 | Portion 3 |
|---|---|---|---|
| Modulus at 100% elongation, p.s.i. | 550 | 400 | 450 |
| Modulus at 200% elongation, p.s.i. | 825 | 660 | 520 |
| Modulus at 300% elongation, p.s.i. | 1,040 | 870 | |
| Modulus at 400% elongation, p.s.i. | | 1,020 | |
| Tensile strength, p.s.i. | 1,120 | 1,070 | 590 |
| Elongation, percent | 365 | 440 | 220 |

The above stress-strain properties indicate that portion 3 containing "Tuads" and DPG was unsatisfactory as to elongation and tensile strength. For example, portion 3 had a maximum tensile strength of 590 p.s.i., which is unsatisfactory (i.e. below 1000). The tensile strength of the portion 2 which contained lead dioxide in addition to the diphenyl guanidine but without a conventional butyl rubber ultra accelerator (such as tetramethyl thiuram disulfide) was noted to have marked improved stress-strain properties over properties of portion 3 containing such an ultra accelerator. It can further be seen that when lead dioxide is completely omitted, that the stress-strain properties are improved more.

Example III

The following pure gum composition (rubbery composition containing no filler) was prepared as follows:

| Component: | Parts by weight |
|---|---|
| Butyl rubber (GR-I-17) | 75 |
| GR-S | 25 |
| Zinc oxide | 5 |
| Diphenyl guanidine | 1 |
| Sulfur | 3 |

The above pure gum composition was then cured for 40 minutes at 307° F. and the following physical properties were noted:

| Properties: | |
|---|---|
| Modulus at 100% Elongation (p.s.i.) | 100 |
| Modulus at 200% Elongation (p.s.i.) | 180 |
| Modulus at 300% Elongation (p.s.i.) | 330 |
| Modulus at 400% Elongation (p.s.i.) | 550 |
| Elongation (percent) | 450 |

The above shows that a satisfactory product as to both tensile modulus and elongation is obtained when employing diphenyl guanidine even in the absence of a filler. In the absence of the diphenyl guanidine, such a pure gum composition as above could not be cured.

Example IV

Additional samples of composition-A were obtained and cured at 307° F. for 40 minutes in the presence of one part by wt. of the below mentioned co-vulcanization agents. The co-vulcanization agents are representative of the various polyalkylated amines, aldehyde amine reaction products, polyaryl guanidines, sulfur-containing guanidines and sulfenamides of the present invention. Said co-vulcanization agents are tabulated below along with stress-strain properties of their respective vulcanizates, all of which were dense, homogeneous specimens and free of blisters, laminations, or cracks.

| Co-vulcanization Agent | Modulus at | | | | Tensile, p.s.i. | Elong., percent |
|---|---|---|---|---|---|---|
| | 100% E, p.s.i. | 200%, p.s.i. | 300%, p.s.i. | 400%, p.s.i. | | |
| Accelerator A-32 (aniline-butyraldehyde reaction product) | 850 | 1,250 | 1,300 | | 1,365 | 310 |
| Hexamethylene tetramine | 410 | 670 | 800 | | | |
| Accelerator #8 (formaldehyde para toluidine reaction product) | 325 | 510 | 620 | | | |
| DPG (diphenyl guanidine) | 645 | 925 | 1,050 | | 1,075 | 305 |
| DOTG (di-ortho tolyl guanidine) | 685 | 1,020 | 1,220 | | 1,250 | 325 |
| Trimene base (tri-ethyl tri methylene triamine) | 650 | 1,000 | 1,250 | | 1,305 | 325 |
| NA-22 (2-mercapto imidazoline, i.e. ethylene-thiourea) | 690 | 1,090 | 1,370 | | 1,440 | 325 |

The following vulcanization agents have also been shown to be effective when employed according to the present invention, (e.g. 1 part of the co-vulcanization each per 100 parts by weight total rubber hydrocarbons):

(1) Tertiary butyl-2-benzothiazole - sulfenamide (preferred)
(2) N-cyclohexyl-2-benzothiazole sulfenamide (less preferred)

All of the above nitrogen-containing organic co-vulcanization agents have an advantage when used in substantially lead-free butyl rubber compositions. This is because light-colored co-vulcanizates can be made only when omitting lead oxides and compounds containing lead and oxygen. Such a light-colored co-vulcanizate would include the following:

| Component: | Parts by weight |
|---|---|
| Co-vulcanization agent | 0.1–10 |
| Butyl rubber | 5–95 |
| GR-S rubber | 5–95 |
| Natural rubber | 5–95 |
| Buna-N rubber | 5–95 |
| TiO$_2$ | 10–200 |
| Zinc oxide | 1.0–200 |
| MgO | 0–300 |
| Ultramarine blue (any conventional blueing agent) | 0.1–2.0 |
| Stearic acid | 0–20 |
| Sulfur | 0.1–40 |

Suitable pigments when employed in minor quantities in pastel butyl rubber composites are as follows: calcium carbonate, ferric hydroxide, chrome-yellow, Prussian blue, phthalocyamine, etc. Conventional non-staining anti-oxidants or even a slightly colored anti-oxidant such as phenyl beta naphthalamine may be employed. However, the non-staining anti-oxidants which are particular efficacious for white butyl co-vulcanizates comprises about 0.1–1 wt. percent based on total rubber polymer of either alkylated aromatic hydrocarbons or alkylated heterocyclics, including bisphenols such as bis(2-hydroxy-3-tertiary butyl-5-methyl phenyl) methane, amino phenols such as lauroyl p-amino phenol, or a $C_5$–$C_9$ alkylated diphenalamine such as heptylated diphenylamine.

Example V

A master batch of butyl and natural rubber was prepared of the following composition:

| Ingredient: | Parts by weight |
|---|---|
| Butyl rubber (GR-I-17) | 75 |
| Natural rubber (smoked sheet) | 25 |
| S.R.F. black | 50 |
| Zinc oxide | 5.0 |
| Sulfur | 3.0 |

The above composition was divided into 2 portions and cured at 307° F. for 40 minutes with 1 part by weight of A-32 (aniline-butyraldehyde reaction product) or DPG (diphenyl guanidine) as the respective co-vulcanization agents as shown below. The physical characteristics of the co-vulcanizates were as follows:

| Properties | A-32 | DPG |
|---|---|---|
| Modulus at 100% E (p.s.i.) | 500 | 585 |
| Modulus at 200% E (p.s.i.) | 835 | 900 |
| Modulus at 300% E (p.s.i.) | 1,100 | 1,140 |
| Tensile strength (p.s.i.) | 1,255 | 1,285 |
| Elongation (percent) | 380 | 390 |

From the above it is apparent that butyl rubber co-vulcanizes satisfactorily with natural rubber in the presence of the organic nitrogen-containing compounds having available $$-\underset{H}{N}-$$

groups according to the present invention to give products having satisfactory tensile strengths, tensile moduli, and elongation. Furthermore, the above products were rubbery, dense, non-porous and substantially completely homogeneous products which were free from laminations, cracks and blisters.

In the drawings:

Figure 1 is a stress-strain plot illustrating the relative rate of curing of several rubber compositions. Curve A is a conventional 100% butyl composition (GR–I–17) is cured with one part by weight of "Tuads." Curve B is also a 100% butyl composition (GR–I–17) which has been cured with one part by weight of diortho tolyl guanidine (DOTG). It is evident that curving rates of the butyl-DOTG composition (curve B) is much slower than the curing rate of the butyl-Tuads composition (curve A).

Curve C represents 100% GR–S cured with DOTG. This curve serves as a control. Curve D is also a control run which represents 100% GR–S cured with Tuads. Curve E represents a composition comprising 75% GR–S and 25% GR–I–17 according to the present invention. This latter composition contains one part by weight of diortho tolyl guanidine (DOTG).

From Figure 1 it is evident that the use of DOTG accelerates the rate of curing of blends of GR–S with butyl rubber. Also, curve B as compared to curve A shows that the use of DOTG greatly retards the curing rate of butyl rubber per se. Furthermore, a comparison of curve E (which represents a composition produced according to the present invention) to curves A, B, C or D shows that the curing rate of blends of butyl rubber and GR–S rubber containing di ortho tolyl guanidine is surprisingly much faster than the curing rate of GR–S alone (or GR–I–17 alone) cured with Tuads or DOTG. Also, it is known that Tuads per se will not co-vulcanize mixtures of butyl rubber with other more highly unsaturated rubbers such as GR–S, natural rubber, Buna-N rubber, etc. A combination of Tuads and DOTG also produces inferior co-vulcanizates of the above rubbers.

One particularly advantageous use for the butyl rubber co-vulcanizates of the present invention is in pneumatic tires of either the inner tube containing variety or in a tubeless type tire.

Figure 2 shows a pneumatic tubeless tire which comprises a hollow toroidal type member which is substantially U-shaped in cross-section by virtue of an open portion which extends around the inner periphery of the member. In other words, the tire is of a tubular type structure which has a cross-section in the form of an open-bellied body with spaced terminal portions to define a member generally resembling a horseshoe. The terminal portions constitute the bead portions 11—11 of the tire inside of which are a plurality of bead wires adhesively imbedded and molded in a rubber. The outer surface of the bead portion is advantageously formed into an air sealing means, such as a plurality of ribs (not shown) to aid in adhesion to rim 12 when the tire is inflated.

The outer surface of the tire also includes tread area 13 and sidewalls 14. The open portion of the horseshoe shaped tire faces that portion of the inner circumference of the tire which is adjacent the said area 13 of the tire. The remaining construction of the tire may vary according to conventional fabrication, but in general, the tire is a multi-layered type of structure with an outer layer as above-mentioned. The layer next adjacent the outer layer generally comprises a carcass 15 which includes a rubber which has incorporated therein a fabric composed of a plurality of cotton, rayon or nylon cords, etc. The tire also includes an inner lining advantageously made from rubber, e.g. butyl rubber, natural rubber and/or co-vulcanizates (or partially cured co-vulcanizates) of butyl rubber and natural rubber or butyl rubber with a buna-type rubber without, but preferably with, natural rubber, all produced according to the present invention. The inner lining must be substantially impermeable to air. For example, the lining may advantageously comprise natural rubber, neoprene-type rubber (i.e. polychlorobutadiene rubber), a rubbery copolymer, or mixtures or co-vulcanizates prepared according to the present invention of any of the above, wherein the copolymer comprises the reaction product of about 20–99.5 wt. percent of a $C_4$–$C_7$ iso-olefin, such as isobutylene, and about 0.5–80 wt. percent of a $C_4$–$C_{14}$ multi-olefin, such as isoprene which has been at least partially vulcanized. The above multi-layers, at least three in number, are conventionally bonded or otherwise adhered together, for example, by cementing and/or especially by vulcanization, co-vulcanization according to the present invention, etc., to form a tire of a unitary structure.

The butyl rubber co-vulcanized compositions of the present invention may be employed generally throughout the tire and may be used alone or in admixture with natural rubber and/or co-vulcanized with certain synthetic rubbers to include Buna-N rubber, chloroprene rubber, polyisoprene, butadiene or isoprene-vinyl pyridine copolymers, and particularly GR–S rubber, etc. However, for the inner lining of the tire, ordinary butyl rubber, butyl rubber co-vulcanized with natural rubber, natural rubber or mixtures thereof is preferred. Also, whereas the inner lining may comprise the butyl-containing rubber compounds before mentioned, the other layers of the tire such as the intermediate carcass layer and/or the outer layer (including the tread area, the sidewall and the outer bead portions, etc.) may comprise butyl rubber co-vulcanized with other conventionally employed rubbers according to the present invention, such as natural rubber and synthetic rubbers (especially highly unsaturated synthetic rubbers) and mixtures thereof (and reclaimed mixtures thereof) especially to include GR–S rubber, natural rubber and/or Buna-N rubber.

A tubeless tire may comprise a casing of an outer layer including the tread, sidewall, outer bead portions, etc., of butyl rubber co-vulcanized with natural rubber, natural rubber, GR–S rubber and/or Buna-N rubber or mixtures thereof or reclaimed mixtures of these rubbers, or mixtures of butyl with equivalent highly unsaturated rubbers which have been co-vulcanized. It also preferably comprises an intermediate layer or carcass of the above rubbers or combinations thereof, especially to include compositions containing butyl rubber, alone or co-vulcanized with natural rubber, GR–S rubber, Buna–N rubber or combinations thereof, and their equivalents.

In another embodiment, the inner layer of the tire which may be butyl rubber alone, butyl rubber co-vulcanized with saturated rubbers, butyl rubber co-vulcanized with highly unsaturated rubbers according to the present invention, or an admixture thereof, which has been at least partially vulcanized by heating for about 3–60 minutes or more at about 100°–350° F. or higher with about 0.2–40.0 (especially 1–25) wt. percent sulfur on a basis of the weight of the total rubber or rubbers as hereinbefore mentioned and which has been cured with any of the heretofore disclosed curing compositions, especially to include curing compositions comprising organic compounds containing at least one $$-\underset{H}{N}-$$

group such as aldehyde amines, polyalkylated amines, poly aryl guanidines, sulfur-containing guanidines, sulfur-containing amides, etc. and optionally but preferably with an additional bivalent metal oxide such as zinc oxide.

While there are above described a number of specific embodiments of the present invention, it is obviously possible to produce other embodiments and various equivalent modifications and variations thereof without departing from the spirit of the invention or the scope of the appended claims.

What is claimed is:

1. A composition comprising an accelerator-free co-vulcanizable admixture of a major amount of a rubbery copolymer containing a major proportion of a $C_4$–$C_8$ olefin and a minor proportion of a $C_4$–$C_{14}$ multiolefin with a minor amount of a more highly unsaturated rubber; about 0.1 to 3 parts of sulfur; and an organic nitrogen-containing compound containing at least one

group, said compound being selected from the group consisting of triethyl-trimethylene triamine, hexamethylene tetramine, diphenyl guanidine, diortho tolyl guanidine, 2-mercapto-imidazoline, tertiary butyl-2-benzothiazole-sulfenamide, N-cyclohexyl-2-benzothiazole sulfenamide, reaction product of aniline and butyr-aldehyde, and reaction product of para-toluidine and formaldehyde.

2. A composition comprising an accelerator-free co-vulcanizable admixture of a major proportion of an isoolefin-multiolefin polymer of butyl rubber; about 0.1 to 3 parts of sulfur; about 5 to 50 parts by weight of zinc oxide per 100 parts of rubber hydrocarbons; a minor proportion of another rubber selected from the group consisting of natural rubber, rubbery butadiene-styrene copolymers, rubbery butadiene-acrylonitrile copolymers, and mixtures thereof; an organic nitrogen-containing compound selected from the group consisting of triethyl-trimethylene triamine, hexamethylene tetramine, diphenyl guanidine, diortho tolyl guanidine, 2-mercapto-imidazoline, tertiary butyl-2-benzothiazole-sulfenamide, N-cyclohexyl-2-benzothiazole sulfenamide, reaction product of aniline and butyr-aldehyde, and reaction product of para-toluidine and formaldehyde; and about 10 to 50 parts by weight of a pigment selected from the group consisting of carbon black and titanium dioxide.

3. A composition comprising an accelerator-free co-vulcanizable admixture of a 75 parts of butyl rubber containing about 85 to 99.5 weight percent of a $C_4$–$C_7$ isoolefin, and about 15 to 0.5 weight percent of a $C_4$–$C_{10}$ multiolefin; 25 parts of at least one other rubber selected from the group consisting of natural rubber, rubbery butadiene-styrene copolymers, rubbery butadiene-acrylonitrile copolymers, and mixtures thereof; about 0.1 to 3 parts by weight of sulfur; about 0.1 to 5.0 parts by weight of a member selected from the group consisting of triethyl-trimethylene triamine, hexamethylene tetramine, diphenyl quanidine, diortho tolyl guanidine, 2-mercapto-imidazoline, tertiary butyl-2-benzothiazole-sulfenamide, N-cyclohexyl-2-benzothiazole sulfenamide, reaction product of aniline and butyr-aldehyde, and reaction product of para-toluidine and formaldehyde; and about 5 to 50 parts by weight of zinc oxide.

4. A vaulcanized composition comprising a major amount of a rubbery polymer containing a major proportion of a $C_4$–$C_8$ isoolefin with a minor proportion of a $C_4$–$C_{14}$ multiolefin; a minor amount of at least one other more highly unsaturated rubber; about 0.1 to 3 parts of sulfur; and an organic nitrogen compound containing at least one amino group, said compound being selected from the group consisting of triethyl-trimethylene triamine, hexamethylene tetramine, diphenyl guanidine, diortho tolyl guanidine, 2-mercapto-imidazoline, tertiary butyl-2-benzothiazole-sulfenamide, N-cyclohexyl-2-benzothiazole sulfenamide, reaction product of aniline and butyr-aldehyde, and reaction product of para-toluidine and form-aldehyde; said composition being free of other added accelerators and having been vulcanized at about 250° to 400° F. for sufficient time to produce a vulcanizate which is not blistered, cracked or porous, has a tensile strength of at least about 1000 p.s.i., and is substantially completely homogeneous.

5. A vulcanized composition according to claim 4 in which the highly unsaturated rubber is selected from the group consisting of natural rubber, rubbery butadiene-styrene copolymers, rubbery butadiene-acrylonitrile copolymers, and mixtures thereof.

6. A vulcanized composition according to claim 4 in which nitrogen-containing organic compound is reaction product of butyraldehyde and aniline.

7. A vulcanized composition according to claim 4 in which the nitrogen-containing organic compound is tertiary butyl-2-benzothiazole-sulfenamide.

8. A vulcanized composition according to claim 4 in which the organic nitrogen-containing compound is triethyl trimethylene triamine.

9. A vulcanized composition according to claim 4 in which the organic nitrogen-containing compound is diortho tolyl guanidine.

10. A process of preparing co-vulcanized blends of an isoolefin-multiolefin polymer of butyl rubber with a more highly unsaturated rubber, which process comprises (1) blending in the absence of added accelerators a major proportion of said butyl rubber; a minor proportion of said highly unsaturated rubber; about 0.1 to 3 parts of sulfur; and about 0.1 to 5.0 parts by weight of an organic nitrogen-containing compound containing at least one

group, said compound being selected from the group consisting of triethyl-trimethylene triamine, hexamethylene tetramine, diphenyl guanidine, diortho tolyl guanidine, 2-mercapto-imidazoline, tertiary butyl-2-benzothiazole-sulfenamide, N-cyclohexyl-2-benzothiazole sulfenamide, reaction product of aniline and butyraldehyde, and reaction product of para-toluidine and formaldehyde; and (2) vulcanizing said blended mixture at a temperature of about 250 to 400° F. at a co-vulcanization rate faster than the vulcanization rate of either of said rubbers alone.

11. A process according to claim 10 in which the highly unsaturated rubber is selected from the group consisting of natural rubber, rubbery butadiene-styrene copolymers, rubbery butadiene-acrylonitrile copolymers, and mixtures thereof in which the co-vulcanization temperature is at about 280 to 320° F.; and in which the co-vulcanization is in the presence of about 5 to 50 parts by weight of added zinc oxide and about 10 to 150 parts by weight of a pigment.

12. A rubber tire which contains in at least one layer thereof a composition comprising a major amount of an isoolefin-multiolefin polymer of butyl rubber which has been co-vulcanized in the absence of added accelerators with a minor proportion of a more highly unsaturated rubber in the presence of about 0.1 to 3 parts of sulfur; about 5 to 50 parts by weight of zinc oxide per 100 parts of total rubber hydrocarbons; and about 0.1 to 5.0 parts by weight of a nitrogen-containing organic compound containing at least one

group, said compound being selected from the group consisting of triethyl-trimethylene triamine, hexamethylene tetramine, diphenyl guanidine, diortho tolyl guanidine, 2-mercapto-imidazoline, tertiary butyl-2-benzothiazole-sulfenamide, N-cyclohexyl-2-benzothiazole sulfenamide, reaction product of aniline and butyraldehyde, and reaction product of para-toluidine and formaldehyde.

13. A vulcanized composition according to claim 4 in which the nitrogen-containing organic compound is ethylene thiourea.

14. A vulcanized composition according to claim 4 in which the nitrogen-containing organic compound is diphenyl guanidine.

15. In a tire adapted for use without an inner tube, the combination which comprises an open-bellied body terminating in spaced bead portions having an inner lining of a member selected from the group consisting of an isoolefin-multiolefin polymer of butyl rubber, natural rubber, co-vulcanizates of a major proportion of an isoolefin-multiolefin polymer of butyl rubber and a minor proportion of natural rubber, which have been co-vulcanized in the absence of added accelerators with about 0.1 to 3 parts of sulfur, about 5 to 30 parts by weight of zinc oxide and about 0.1 to 5.0 parts by weight of an organic nitrogen-containing compound selected from the group consisting of triethyl-trimethylene triamine, hexamethylene tetramine, diphenyl guanidine, diortho tolyl guanidine, 2 - mercapto - imidazoline, tertiary butyl - 2 - benzothiazole-sulfenamide, N-cyclohexyl-2-benzothiazole sulfenamide, reaction product of aniline and butyraldehyde, and reaction product of para-toluidine and formaldehyde, air sealing means at said bead portions, and a tread area intermediate of said bead portions.

16. In a tire adapted for use without an inner tube, the combination which comprises an open-bellied body terminating in spaced bead portions having an inner lining, air sealing means at said bead portions and a tread area intermediate of said bead portions, wherein the composition of said tread area comprises a minor proportion of a vulcanized rubbery polymer selected from the group consisting of natural rubber, rubbery diene-styrene copolymers, rubbery diene-acrylonitrile copolymers, reclaimed rubber and mixtures thereof, which have been co-vulcanized in the absence of added accelerators with a major proportion of an isoolefin-multiolefin polymer of butyl rubber in the presence of about 0.1 to 3 parts of sulfur, about 10 to 150 parts by weight of a pigment, about 5 to 30 parts by weight of zinc oxide and about 0.1 to 5.0 parts by weight of an organic nitrogen-containing compound selected from the group consisting of triethyl-trimethylene triamine, hexamethylene tetramine, diphenyl guanidine, diortho tolyl guanidine, 2 - mercapto - imidazoline, tertiary butyl - 2 - benzothiazole-sulfenamide, N-cyclohexyl-2-benzothiazole sulfenamide, reaction product of aniline and butyraldehyde, and reaction product of para-toluidine and formaldehyde per 100 parts of total rubber hydrocarbons.

17. In a process for manufacturing a tubeless tire including carcass member, the combination which comprises at least partially vulcanizing in the absence of added accelerators to said carcass member a layer disposed interiorly thereof, said layer comprising a member selected from the group consisting of a rubbery copolymer containing about 85 to 99.5 weight percent of an isoolefin and a minor proportion of a multiolefin reactive therewith, natural rubber and at least patrially vulcanized reaction products manufactured in the absence of added accelerators of a major proportion of an unvulcanized rubbery copolymer as above with a minor proportion of natural rubber, wherein the co-vulcanization has been accomplished in the absence of added accelerators and in the presence of about 0.1 to 3 parts of sulfur, about 5 to 50 parts by weight of zinc oxide, and about 0.1 to 5.0 parts by weight of an organic nitrogen-containing compound selected from the group consisting of triethyl-trimethylene triamine, hexamethylene tetramine, diphenyl guanidine, diortho tolyl guanidine, 2-mercapto-imidazoline, tertiary butyl - 2 - benzothiazole - sulfenamide, N-cyclohexyl-2-benzothiazole sulfenamide, reaction product of aniline and butyraldehyde, and reaction product of para-toluidine and formaldehyde; said co-vulcanization having been at a temperature level of between about 250° and 400° F.

18. In a process for manufacturing a tubeless tire including a carcass member, the combination which comprises at least partially vulcanizing in the absence of added accelerators to said carcass member a layer exposed exteriorly thereof comprising an admixture of a major amount of a rubbery copolymer containing about 85 to 99.5 weight percent of a $C_4$ to $C_7$ isoolefin and a minor proportion of a $C_4$ to $C_{14}$ multiolefin, with a minor amount of a more highly unsaturated rubber selected from the group consisting of natural rubber, rubbery diene-styrene copolymers, rubber diene-acrylonitrile copolymers, mixtures thereof, reclaimed mixtures thereof and partially vulcanized mixtures thereof, and completely vulcanizing said admixture in the absence of added accelerators and in the presence of about 0.1 to 3 parts of sulfur, about 5 to 50 parts by weight of zinc oxide, about 10 to 150 parts by weight of a pigment, and about 0.1 to 5.0 parts by weight of an organic nitrogen-containing compound selected from the group consisting of triethyl-trimethylene triamine, hexamethylene tetramine, diphenyl guanidine, diortho tolyl guanidine, 2-mercapto-imidazoline, tertiary butyl-2-benzothiazole-sulfenamide, N-cyclohexyl-2-benzothiazole sulfenamide, reaction product of aniline and butyraldehyde, and reaction product of para-toluidine and formaldehyde at a temperature level of between about 250° to 400° F.

References Cited in the file of this patent

UNITED STATES PATENTS

| | | |
|---|---|---|
| 2,557,642 | Dudley | June 19, 1951 |
| 2,566,329 | Hessney et al. | Sept. 4, 1951 |
| 2,575,249 | Connell et al. | Nov. 13, 1951 |
| 2,582,795 | Prentiss et al. | Jan. 15, 1952 |
| 2,588,993 | Schroeder | Mar. 11, 1952 |
| 2,676,636 | Sarbach | Apr. 27, 1954 |
| 2,698,041 | Morrissey et al. | Dec. 28, 1954 |
| 2,700,997 | Morrissey et al. | Feb. 1, 1955 |

FOREIGN PATENTS

| | | |
|---|---|---|
| 1,085,801 | France | Aug. 4, 1954 |